(12) United States Patent
Shimoyama et al.

(10) Patent No.: US 6,965,172 B2
(45) Date of Patent: Nov. 15, 2005

(54) STARTER FOR CRANKING INTERNAL COMBUSTION ENGINE

(75) Inventors: Takeshi Shimoyama, Kariya (JP);
Youichi Hasegawa, Kasugai (JP);
Sadayoshi Kajino, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/938,575

(22) Filed: Sep. 13, 2004

(65) Prior Publication Data

US 2005/0082835 A1    Apr. 21, 2005

(30) Foreign Application Priority Data

Oct. 15, 2003  (JP)  .............................. 2003-355170

(51) Int. Cl.[7] ........................................... H02K 23/60
(52) U.S. Cl. .................... 290/38 A; 290/38 A; 290/46; 290/48; 310/23; 310/83; 310/239
(58) Field of Search ................................. 290/38 R, 48, 290/38 A, 46; 310/23, 83, 239

(56) References Cited

U.S. PATENT DOCUMENTS 6,114,771 A  *  9/2000  Takagi et al. ............. 290/38 R
6,166,448 A  *  12/2000  Ando et al ................ 290/38 R
6,201,311 B1  *  3/2001  Kamei et al. .............. 290/38 R
2004/0032309 A1      2/2004  Kajino et al.

FOREIGN PATENT DOCUMENTS

JP           U 61-35556        3/1986

* cited by examiner

*Primary Examiner*—Darren Schuberg
*Assistant Examiner*—Iraj A. Mohandesi
(74) *Attorney, Agent, or Firm*—Oliff & Berridge, PLC

(57) ABSTRACT

A starter for cranking an internal combustion engine is mainly composed of an electric motor and a magnetic switch having a battery bolt connected to an on-board battery and a motor bolt connected to the electric motor. When the magnetic switch is closed, electric power is supplied to the electric motor to thereby generate a rotational torque for cranking the engine. One end of a motor terminal is electrically connected to the motor bolt, and the other end is led into a motor casing through a rubber insulator supported on the motor casing. The motor terminal includes one or more curved portions having resiliency, and they are positioned between the rubber insulator and the motor bolt. Water penetration into the motor casing is prevented by the rubber insulator, and the vibration of the motor terminal is alleviated by resiliency of the curved portions.

15 Claims, 8 Drawing Sheets

STARTER FOR CRANKING INTERNAL COMBUSTION ENGINE

CROSS-REFERENCE TO RELATED APPLICATION

This application is based upon and claims benefit of priority of Japanese Patent Application No. 2003-355170 filed on Oct. 15, 2003, the content of which is incorporated herein by reference.

BACKGROUND OF THE INVENTION

1. Field of the Invention

The present invention relates to a starter for cranking an internal combustion engine, the starter having an electric motor and a magnetic switch fixed to a common housing so that a rotating axis of the electric motor and an operating axis of the magnetic switch are positioned in parallel to each other.

2. Description of Related Art

An example of this type of starter is disclosed in JP-U-61-35556. The starter disclosed therein has an electric motor and a magnetic switch, and the magnetic switch is connected to the electric motor through a connecting member. One end of the connecting member is connected to a lead wire led out from the electric motor by forcibly pressing the connecting member against the lead wire. Another example of this type of starter is shown in FIG. 11 attached hereto. In this starter, an electric motor 100 and a magnetic switch 110 are connected to a common housing 120 with bolts (not shown).

In the starter disclosed in JP-U-61-35556, the lead wire led out from the electric motor is formed by twisting plural copper wires. Therefore, there is a possibility that water splashed on the starter enters into the electric motor along the lead wire by a capillary action. In the starter shown in FIG. 11, a housing of the magnetic switch 110 is connected to the common housing 120 in an overhang structure with a long overhang length L1. Therefore, there is a possibility that the lead wire connecting the magnetic switch to the electric motor may be disconnected or cut due to vibration transmitted from the engine.

SUMMARY OF THE INVENTION

The present invention has been made in view of the above-mentioned problems, and an object of the present invention is to provide an improved starter, in which water penetration into an electric motor is prevented and a member connecting a magnetic switch to the electric motor is made resistive to vibration between.

The starter for cranking an internal combustion engine is composed of an electric motor, a magnetic switch for supplying electric power to the electric motor, a planetary gear speed-reduction device for reducing rotational speed of the electric motor, and other associated components. The planetary gear speed-reduction device is contained in a housing that includes a switch case in which the magnetic switch is disposed. A motor casing in which the electric motor is contained is connected to the housing. An excitation coil of the magnetic switch is contained in the switch case, and an opening of the switch case is closed with a contact cover to which a battery bolt connected to an on-board battery and a motor bolt connected to the electric motor are fixedly connected.

The motor bolt of the magnetic switch is electrically connected to the electric motor contained in the motor casing through a motor terminal. One end of the motor terminal is connected to the motor bolt, and the other end of the motor terminal is led into the motor casing and electrically connected to the electric motor. A rubber insulator is supported on the motor casing through which the motor terminal is led into the motor casing. One or more curved portions having resiliency are formed on the motor terminal, and the curved portions are positioned between the rubber insulator and the motor bolt. A hangover distance of the motor bolt from the contact case closing the opening of the switch case is made as short as possible to reduce vibration of the motor bolt.

The motor terminal is led into the motor casing through the rubber insulator and is held water-tightly by the rubber insulator. Therefore, water splashed on the motor casing is prevented from entering into the electric motor. The motor terminal includes the curved portions having resiliency. Therefore, vibration of the motor terminal due to vibration transmitted from the engine is alleviated.

The motor terminal and the rubber insulator may be integrally molded to form a unitary body. The motor terminal may be divided into two portions, a switch-side portion connected to the motor bolt and a motor-side portion connected to the electric motor. The housing may be divided into a front housing and a center housing that contains the planetary gear speed-reduction device therein. In this case, the center housing is sandwiched between the front housing and the motor case. Other objects and features of the present invention will become more readily apparent from a better understanding of the preferred embodiments described below with reference to the following drawings.

DETAILED DESCRIPTION OF THE PREFERRED EMBODIMENTS

Figure 1:
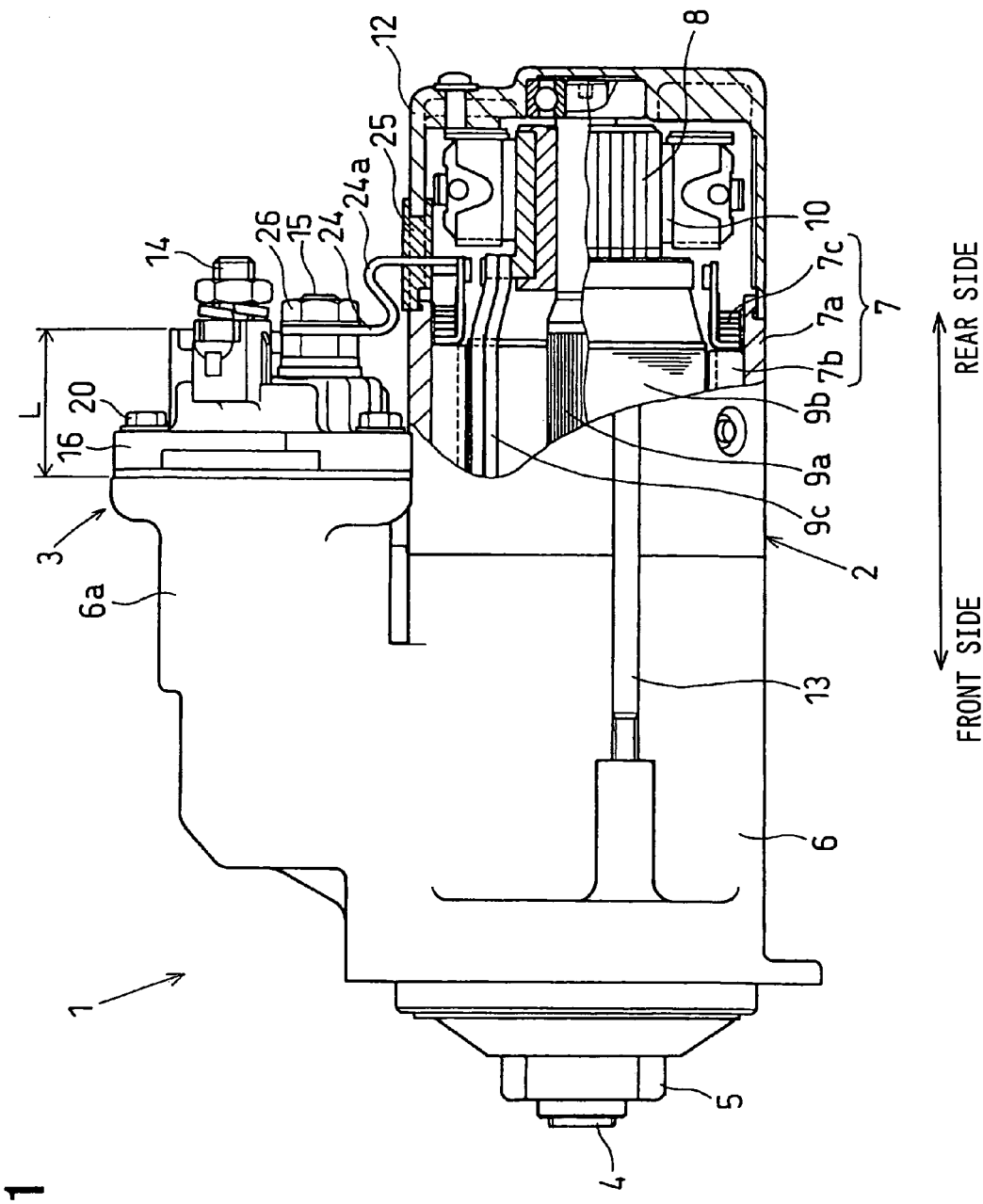
FIG. 1 is a side view, partially cross-sectioned, showing a starter as a first embodiment of the present invention.

A first embodiment of the present invention will be described with reference to FIGS. 1–3. As shown in FIG. 1, a starter 1 for cranking an internal combustion engine includes an electric motor 2, a magnetic switch 3 having a power supply circuit for supplying electric power to the electric motor, an output shaft 4 driven by the electric motor, and a pinion 5 disposed on the output shaft. The electric motor 2 and the magnetic switch 3 are connected to a common housing 6. In the housing 6, a planetary gear speed-reduction device (not shown) for reducing a rotational speed of the electric motor 2, a one-way clutch (not shown) for transmitting rotational torque of the planetary gear speed-reduction device to the output shaft 4, and a link mechanism for shifting the output shaft 4 forward together with the pinion 5 are also disposed. The link mechanism is driven by a plunger 19 (refer to FIG. 2) contained in the magnetic switch 3.

The electric motor 2 is a known type of a direct current motor, which is composed of a stator 7 for generating a magnetic field therein and an armature 9 having a commutator 8. Electric power is supplied from an on-board battery 11 (shown in FIG. 2) to the armature 9 through brushes 10 contacting the commutator 8 when the power supply circuit in the magnetic switch is closed. The stator 7 is composed of a cylindrical yoke 7a, poles 7b fixed to the yoke 7a and field coils 7c wound around the poles 7b. The field coil 7c is connected to the armature 9a through a plus brush 10, and a minus brush is grounded, as shown in FIG. 2. The armature 9 is composed of an armature shaft 9a, an armature core 9b fixed to the armature shaft 9a and an armature coil 9c wound around the armature core 9b.

A front end of the yoke 7a in which the armature 9 is rotatably disposed is connected to a rear opening of the housing 6, and a rear end of the yoke 7a is closed with a rear end frame 12. The electric motor 2 is fixedly connected to the housing 6 with through-bolts 13, as shown in FIG. 1. A solenoid unit (explained below) of the magnetic switch 3 is contained in a switch case 6a formed integrally with the housing 6.

The magnetic switch 3 is composed of the solenoid unit contained in the switch case 6a and a contact cover 16 closing an open end of the switch case 6a. As shown in FIG. 2, the solenoid unit is composed of an excitation coil 18 which is energized with current supplied from the battery 11 when a starter switch 17 is closed, a plunger 19 disposed in and driven by the excitation coil 18, and a return spring (not shown) for returning the plunger 19 to its initial position. The power supply circuit including a pair of stationary contacts 21 (21a and 21b) is disposed inside the contact cover 16, and a battery bolt 14 connected to the battery 11 through a battery cable 23 and a motor bolt 15 connected to the field coil 7c through a motor terminal 24 are fixedly connected to the contact cover 16. The contact cover 16 made of a material such as resin is connected to the switch case 6a by bolts 20, as shown in FIG. 1.

Figure 2:
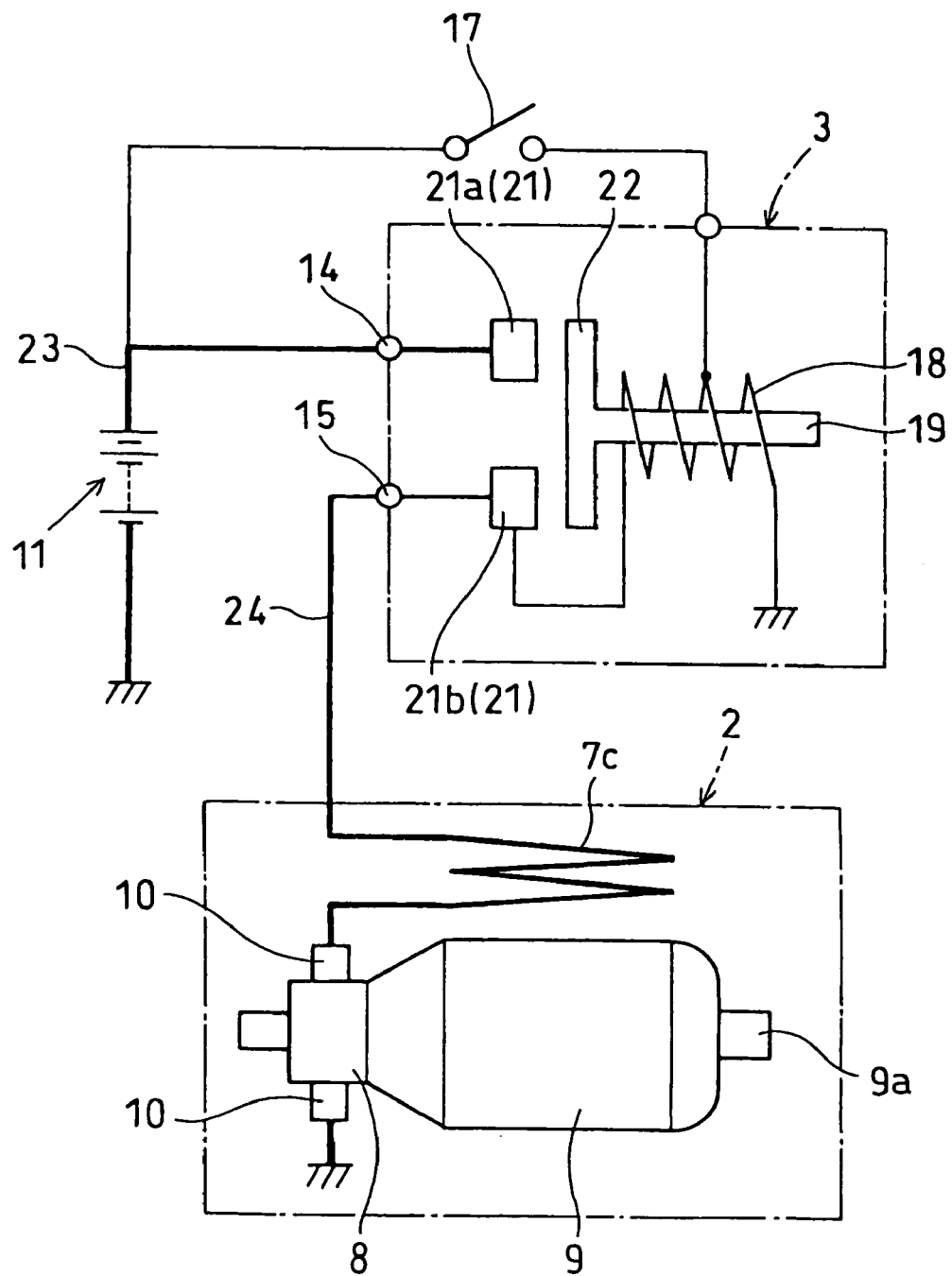
FIG. 2 is a circuit diagram showing electrical connections in the starter.

As shown in FIG. 2, the power supply circuit is composed of the pair of stationary contacts 21 (21a and 21b) and a movable contact 22 connected to the plunger 19. The power supply circuit is closed when the pair of stationary contacts 21 are closed by the movable contact 22, and the power supply circuit is opened when the movable contact 22 opens the pair of stationary contacts 21. The battery bolt 14 is electrically and mechanically connected to one of the stationary contact 21a, and the motor bolt 15 is similarly connected to the other one of the stationary contact 21b. The plunger 19 moves in a direction of an operating axis of the magnetic switch 3 extending in parallel to the armature shaft 9a.

As shown in FIG. 1, a motor casing covering the electric motor 2 is composed of the yoke 7a and the rear end frame 12 connected to each other. A grommet 25 made of rubber forming an insulator is disposed in a hole formed in the motor casing. The motor terminal 24 is made of a single metallic plate or rod, and a ring-shaped first end thereof having a round hole (such as a hole shown in FIG. 6) is connected to the motor bolt 15 with a nut 26. The second end of the motor terminal 24 is led through a hole formed in the grommet 25 into an inside space of the electric motor 2 and is electrically and mechanically connected to one end of the field coil 7c. The motor terminal 24 is led through the grommet 25 water-tightly, so that water splashed on the motor casing does not enter into the electric motor 2. The motor terminal 24 includes curved portions 24a formed between the motor bolt 15 and the grommet 25, so that the curved portions form an S-shape having resiliency.

Operation of the starter 1 described above will be explained, referring to FIGS. 1 and 2. Upon closing the starter switch 17, the excitation coil 18 is energized and thereby the plunger 19 is driven. The output shaft 4 having the pinion 5 thereon is pushed forward (toward the front side of the starter 1) by a lever mechanism driven by the plunger 19. When the pinion 5 engages with a ring gear of an engine, the stationary contacts 21 are closed by the movable contact 22. Electric power is supplied to the armature 9, and thereby the armature 9 is rotated. When the pinion 5 does not smoothly engage with the ring gear, the pinion 5 is slowly rotated relative to the ring gear to thereby establish engagement between the pinion 5 and the ring gear. The rotational torque of the armature 9 is transmitted to the output shaft 4 and the pinion 5 through the one-way clutch after the rotational speed of the armature 9 is reduced by the planetary gear speed-reduction device. Thus, the engine is cranked up by the rotational torque of the pinion 5.

Following advantages are attained in the first embodiment described above. Since the motor terminal 24 is led into the inside space of the electric motor 2 through a grommet 25, the motor terminal 24 is sealed water-tightly with the grommet 25. Accordingly, water is prevented from entering into the electric motor 2. Since the second end of the motor terminal 24 is connected to the field coil 7c inside the motor casing, the connecting portion is not exposed to water. Therefore, corrosion of the connecting portion due to water is avoided.

Figure 11:
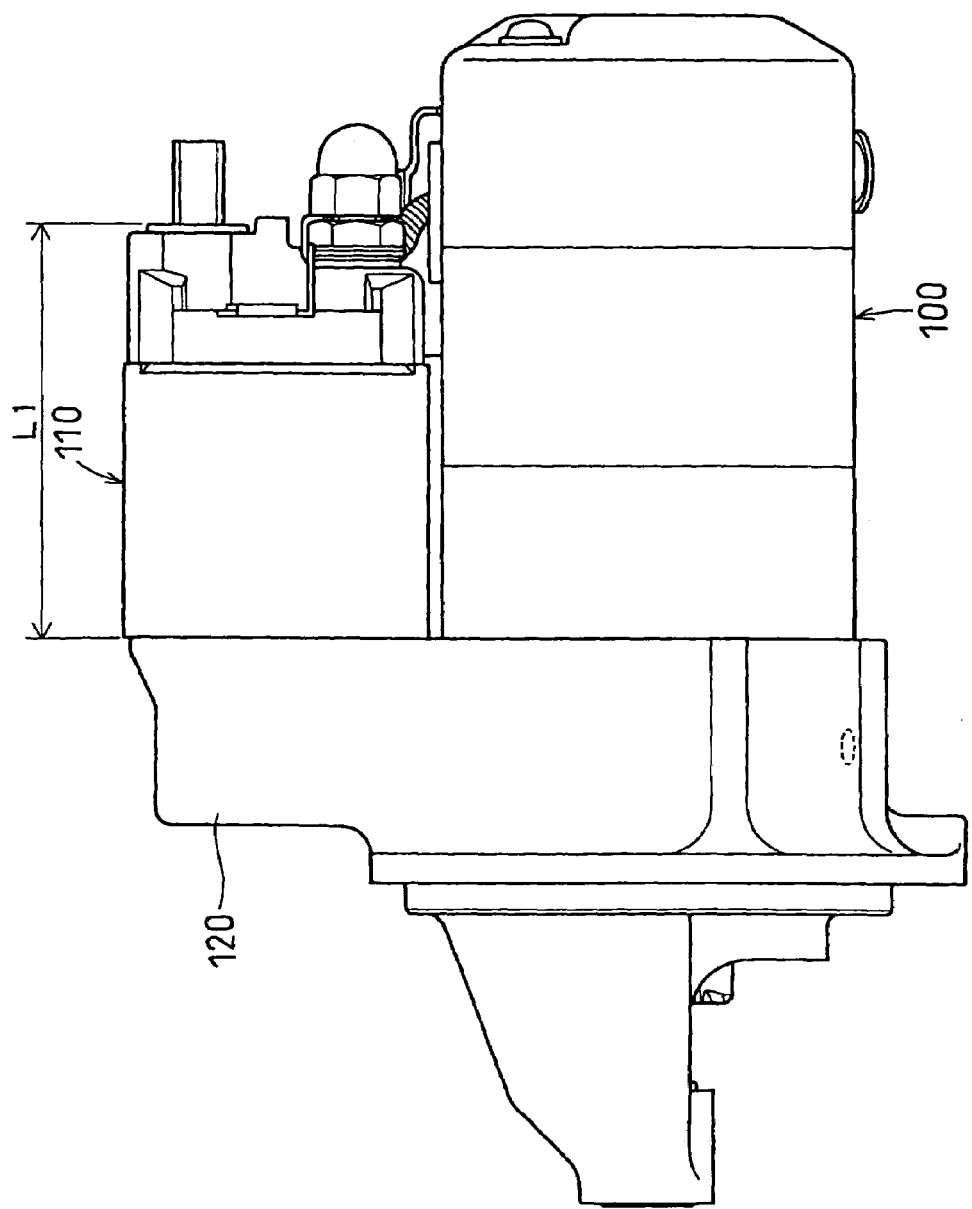
FIG. 11 is a side-view showing a conventional starter.

Since an overhang length L (shown in FIG. 1) of the contact cover 16 is much shorter than an overhang length L1 in the conventional starter shown in FIG. 11, vibration of the motor bolt 15 is much smaller than that of the conventional starter. The overhang length L of the first embodiment can be made short because the switch case 6a is integrally formed with the housing 6 and the open end of the switch case 6a is closed with the contact cover 16. Since the motor terminal 24 includes the S-shaped portion formed by the curved portions 24a, vibration is absorbed by the resiliency of the S-shaped portion. Therefore, the motor terminal 24 can be made strong against vibration. The S-shaped portion further serves to easily adjust the position of the motor terminal 24 relative to the motor bolt 15 in an assembling process of the starter 1.

Figure 3A:
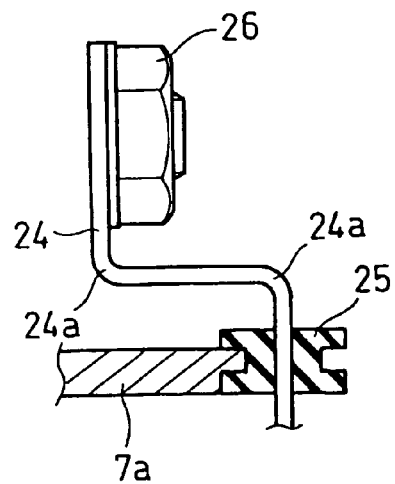
FIGS. 3A–3C show modified forms of a motor terminal connecting a magnetic switch to an electric motor in the starter.
Figure 3B:
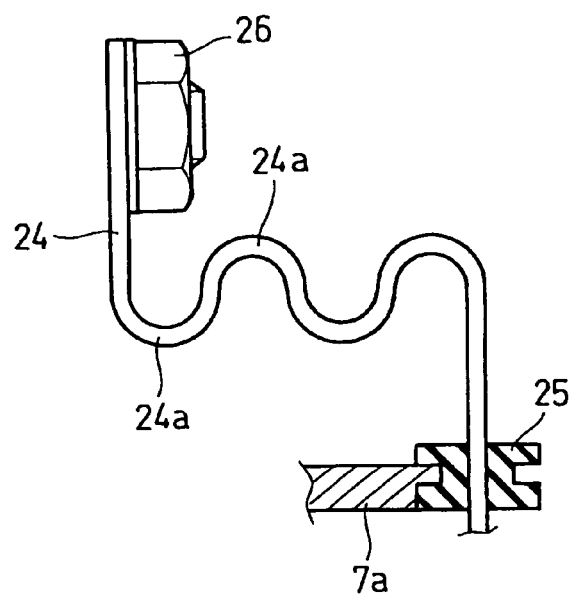
Figure 3C:
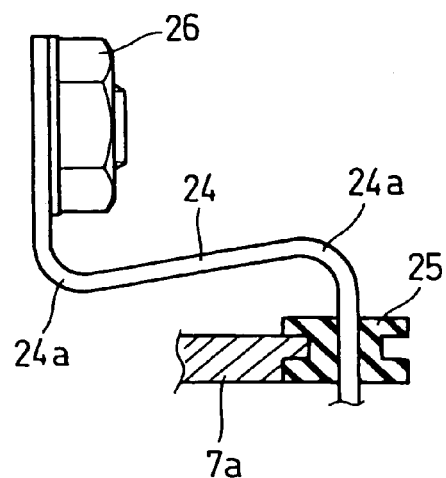

The shape of the motor terminal shown in FIG. 1 may be variously modified. Some examples are shown in FIGS. 3A–3C. In FIG. 3A, the motor terminal 24 is crank-shaped with two angled portions 24a. In FIG. 3B, the motor terminal 24 is wave-shaped with waved portions 24a. In FIG. 3C, the motor terminal 24 is slightly sloped with angled portions 24a. Other modifications are possible as long as resiliency for improving vibration-resistance is provided in the motor terminal 24.

Figure 4:
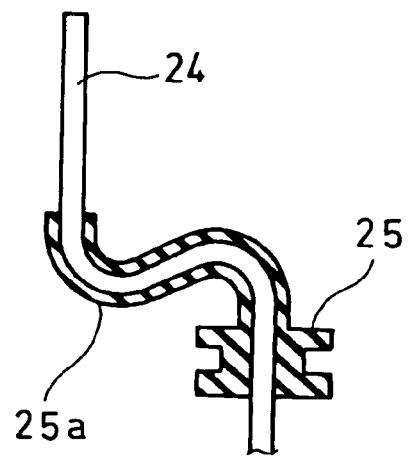
FIG. 4 is a cross-sectional view showing a motor terminal as a second embodiment of the present invention.

A motor terminal 24 as a second embodiment of the present invention is shown in FIG. 4. In this embodiment, the motor terminal 24 is molded integrally with a rubber grommet 25 having an extended portion 25a. The extended portion 25a covers the outside surface of the motor terminal 24 to thereby improve insulation. In this embodiment, it is not necessary to forcibly insert the motor terminal 24 into the hole of the rubber grommet 25. Accordingly, possible damages to the grommet 25 to be caused in the inserting process can be avoided. Since the rubber of the grommet 25 tightly adheres to the motor terminal 24, water-tightness therebetween is further improved.

Figure 5:
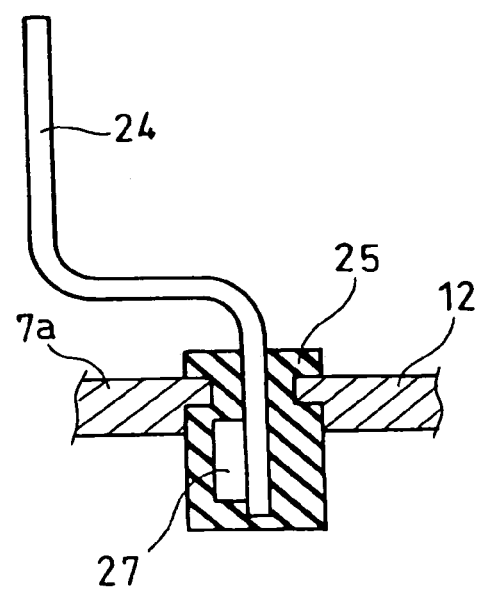
FIG. 5 is a cross-sectional view showing a motor terminal as a third embodiment of the present invention.

A motor terminal 24 as a third embodiment of the present invention is shown in FIG. 5. In this embodiment, a connecting portion 27 connecting the second end of the motor terminal 24 to the end of the field coil 7c is covered with the rubber grommet 25. In this manner, the connecting portion 27 which is not strong against vibration is resiliently held by the grommet 25 to improve vibration-resistance.

Figure 6:
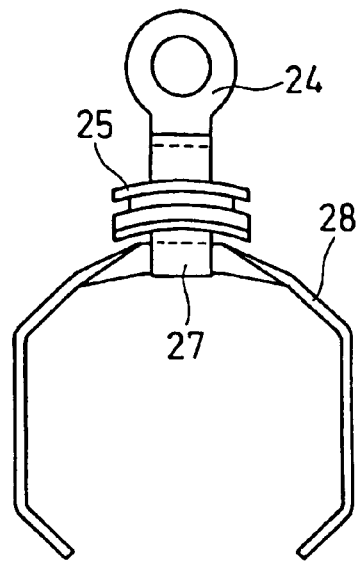
FIG. 6 is a plan view showing a motor terminal connected to a conductor bar, as a fourth embodiment of the present invention.
Figure 7:
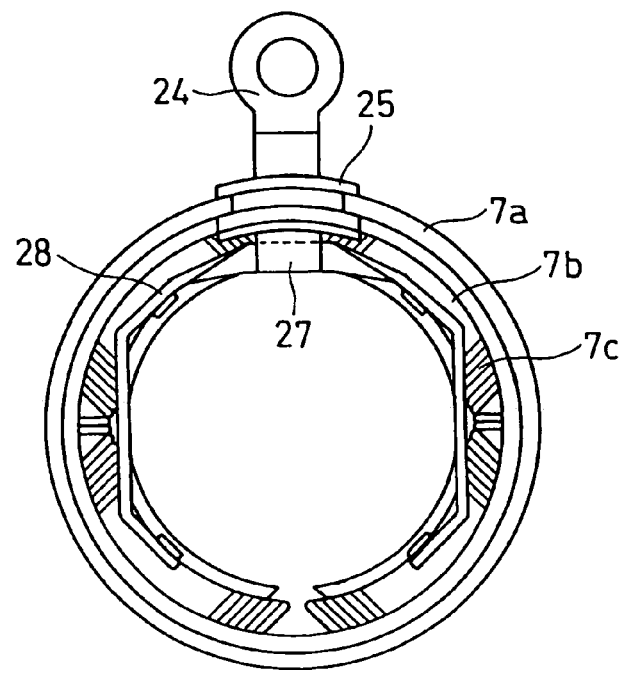
FIG. 7 is a plan view showing an inside of an electric motor in which the conductor bar shown in FIG. 6 is disposed.

A motor terminal 24 as a fourth embodiment of the present invention is shown in FIGS. 6 and 7. In this embodiment, a connector bar 28, which is connected to field coils 7c and disposed in the yoke 7a as shown in FIG. 7, is connected to the second end of the motor terminal 24, forming a connecting portion 27. The connecting portion 27 is positioned inside the motor casing, and accordingly, it is not exposed to splashed water. Further, since the second end of the motor terminal 24 is mechanically supported by the connector bar 28, the mechanical strength against vibration is improved.

Figure 8:
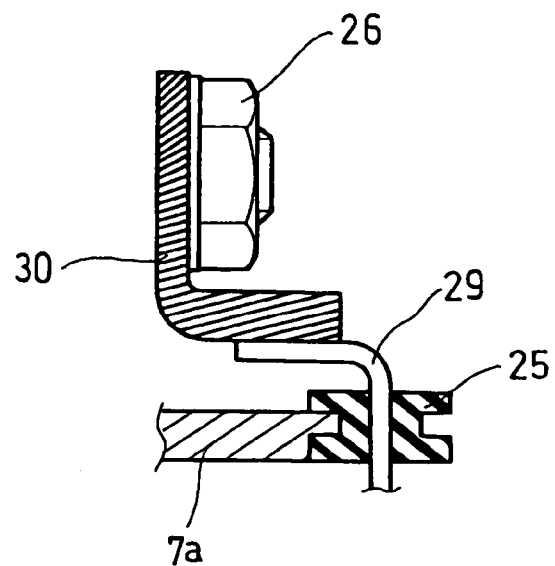
FIG. 8 is a cross-sectional view showing a motor terminal composed of a switch-side portion and a motor-side portion, as a fifth embodiment of the present invention.
Figure 9:
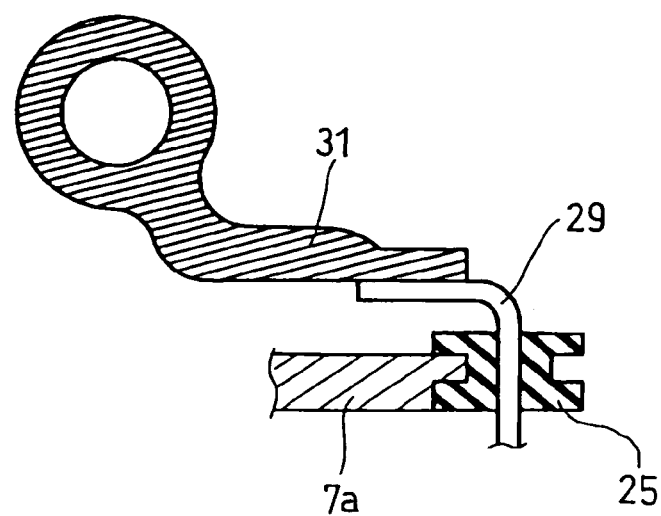
FIG. 9 is a cross-sectional view showing a modified form of the motor terminal shown in FIG. 8.

A fifth embodiment of the present invention is shown in FIGS. 8 and 9. In this embodiment, the motor terminal 24 is divided into two portions, a switch-side portion 30 and a motor-side portion 29. The motor-side portion 29 goes through the grommet 25 water-tightly in the same manner as in the foregoing embodiments. The switch-side portion 30 may be made of a solid metal plate as shown in FIG. 8, or it may be made by twisting plural copper wires as shown in FIG. 9 (the switch-side portion made of twisted copper wires is labeled with a reference number 31). The switch-side portion 30 shown in FIG. 8 may include curved portions having resiliency. Similarly, the motor-side portion 29 shown in FIGS. 8 and 9 may include a curved portion or curved portions to give resiliency thereto. Since the motor terminal connecting the motor bolt 15 and the field coil 7c is divided into two portions in this embodiment, adjustment of a distance between the contact cover 16 and the grommet 25 can be easily made when the distance differs from type to type of the starter.

Figure 10:
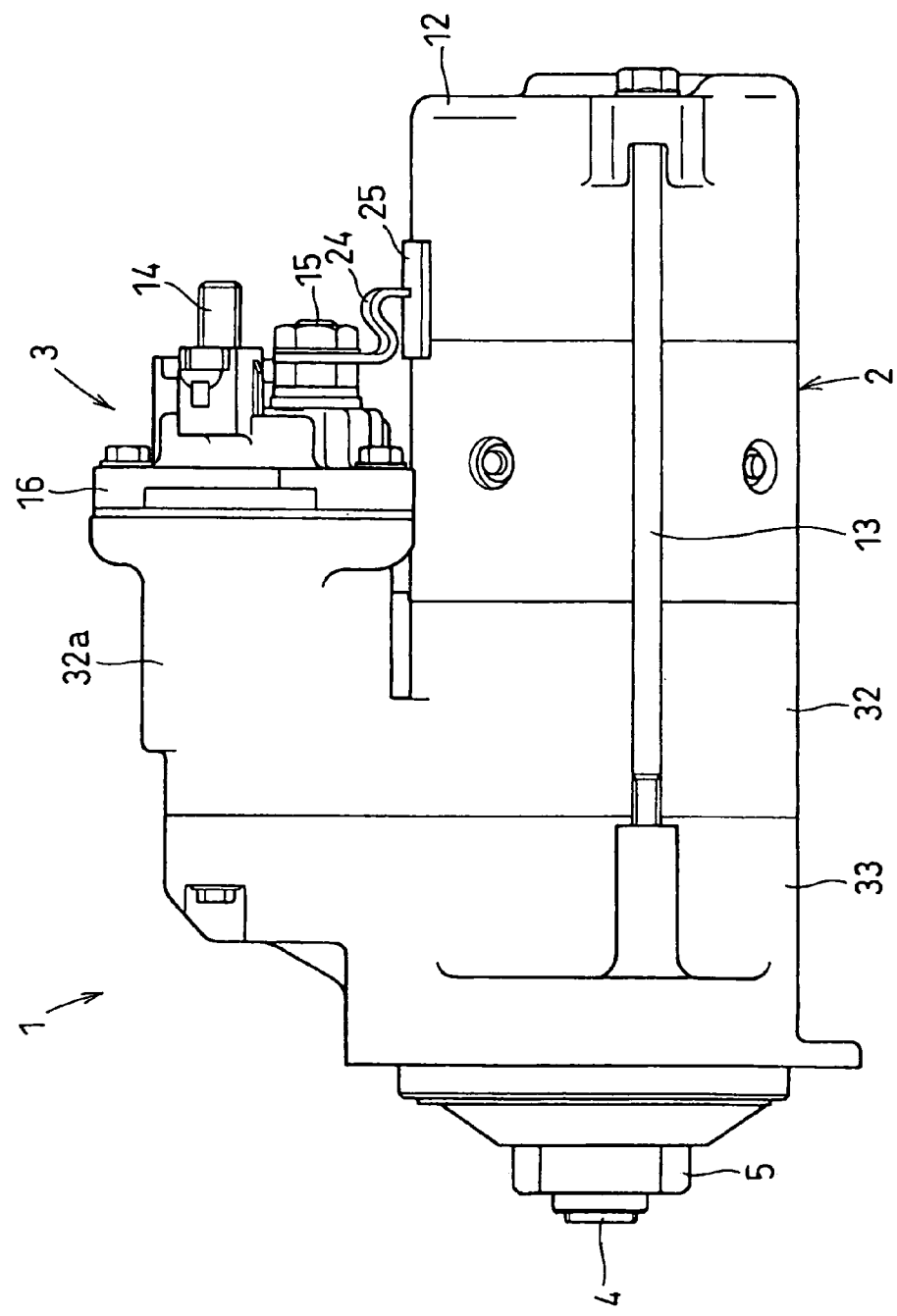
FIG. 10 is a side-view showing a starter as a six embodiment of the present invention.

A sixth embodiment of the present invention is shown in FIG. 10. In this embodiment, the housing 6 shown in FIG. 1 is divided into two housings, a front housing 33 and a center housing 32. The planetary gear speed-reduction device is contained in the center housing 32, and the center housing 32 is firmly held between the front housing 33 and the electric motor 2 by fastening the through-bolts 13. A switch case 32a containing the solenoid unit therein is formed integrally with the center housing 32. Since the front housing 33 is separated from other portions in this embodiment, starters to be mounted on engines having different mounting dimensions can be manufactured by only changing the front housing 33 and without changing other portions.

The present invention is not limited to the embodiments described above, but it may be variously modified. For example, the field coil 7c connected to the plus brush 10 (as shown in FIG. 2) may be connected to the minus brush 10.

In this case, the second end of the motor terminal 24 is directly connected to a lead wire (pig tail) of the plus brush 10. The field coil 7c may be replaced with permanent magnets. In this case, the second end of the motor terminal 24 is directly connected to a lead wire of the plus brush 10. In the foregoing embodiments, the pinion 5 disposed on the output shaft 4 is moved together with the output shaft 4. This structure may be modified so that the pinion 5 slides on the output shaft 4.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A starter for cranking an internal combustion engine, the starter comprising:
   an electric motor powered by a battery, the electric motor being contained in a motor casing;
   a magnetic switch connected between the electric motor and the battery for supplying electric power from the battery to the electric motor, the magnetic switch including a battery bolt connected to the battery and a motor bolt connected to the electric motor;
   a planetary gear speed-reduction device for reducing rotational speed of the electric motor;
   a housing containing the planetary gear speed-reduction device and the magnetic switch therein and supporting the electric motor so that an operating axis of the magnetic switch extends in parallel to a rotational axis of the electric motor; and
   a motor terminal for connecting the motor bolt of the magnetic switch to the electric motor, wherein:
   a first end of the motor terminal is electrically connected to the motor bolt, and a second end of the motor terminal is led through the motor casing and electrically connected to the electric motor inside the motor casing; and
   the motor terminal is water-tightly held by a rubber insulator supported on the motor casing.

2. The starter as in claim 1, wherein:
   the magnetic switch includes an excitation coil and a contact cover to which the battery bolt and the motor bolt are fixedly connected; and
   the excitation coil is contained in a switch case formed integrally with the housing, and the contact cover is connected to and supported by the switch case.

3. The starter as in claim 1, wherein:
   the motor terminal includes at least one curved portion having resiliency, the curved portion being positioned between the motor bolt and the rubber insulator.

4. The starter as in claim 1, wherein:
   the motor terminal and the rubber insulator are integrally molded.

5. The starter as in claim 1, wherein:
   the electric motor includes a field coil; and
   one end of the field coil is connected to an armature of the electric motor via a brush and the other end of the field coil is connected to the second end of the motor terminal via a connector bar.

6. The starter as in claim 1, wherein:
   a portion connecting the second end of the motor terminal to the electric motor is covered with the rubber insulator.

7. A starter for cranking an internal combustion engine, the starter comprising:
an electric motor powered by a battery, the electric motor being contained in a motor casing;
a magnetic switch connected between the electric motor and the battery for supplying electric power from the battery to the electric motor, the magnetic switch including a battery bolt connected to the battery and a motor bolt connected to the electric motor;
a planetary gear speed-reduction device for reducing rotational speed of the electric motor;
a housing containing the planetary gear speed-reduction device and the magnetic switch therein and supporting the electric motor so that an operating axis of the magnetic switch extends in parallel to a rotational axis of the electric motor; and
a motor terminal for connecting the motor bolt of the magnetic switch to the electric motor, wherein:
the motor terminal is composed of a switch-side portion and a motor-side portion;
the switch-side portion is electrically connected to the motor bolt of the magnetic switch, and the motor-side portion is led through the motor casing and electrically connected to the electric motor inside the motor casing;
the motor-side portion is water-tightly held by a rubber insulator supported on the motor casing;
the magnetic switch includes an excitation coil and a contact cover to which the battery bolt and the motor bolt are fixedly connected; and
the excitation coil is contained in a switch case formed integrally with the housing, and the contact cover is connected to and supported by the switch case.

8. The starter as in claim 7, wherein:
the switch-side portion of the motor terminal is a solid member made of a metallic material.

9. The starter as in claim 7, wherein:
the switch-side portion of the motor terminal is a lead wire formed by twisting plural copper wires.

10. The starter as in claim 7, wherein:
the motor-side portion of the motor terminal includes at least one curved portion having resiliency, the curved portion being positioned outside the motor casing.

11. The starter as in claim 8, wherein:
the switch-side portion of the motor terminal includes at least one curved portion having resiliency.

12. The starter as in claim 7, wherein:
the motor-side portion of the motor terminal is integrally molded with the rubber insulator.

13. The starter as in claim 7, wherein:
the electric motor includes a field coil; and
one end of the field coil is connected to an armature of the electric motor via a brush, and the other end of the field coil is connected to the motor-side portion of the motor terminal via a connector bar.

14. The starter as in claim 7, wherein:
a portion connecting the motor-side portion of the motor terminal to the electric motor is covered with the rubber insulator.

15. The starter as in claim 1, wherein:
the housing is divided into a front housing and a center housing having a switch case integrally formed therewith;
the planetary gear speed reduction device is contained in the center housing, and the magnetic switch is disposed in the switch case; and
the center housing is firmly held between the front housing and the motor casing.

* * * * *